United States Patent [19]

Wessendorf

[11] 3,711,561
[45] Jan. 16, 1973

[54] NOVEL PREPARATION OF BROMONITRO ALCOHOLS

[76] Inventor: Richard Wessendorf, Essen-Heisingen, Germany

[73] Assignee: Henkel & Cie. GmbH, Dusseldorf-Holthausen, Germany

[22] Filed: Oct. 22, 1970

[21] Appl. No.: 83,191

[30] Foreign Application Priority Data

Oct. 28, 1969 Germany.................P 19 54 173.2

[52] U.S. Cl..................................260/633
[51] Int. Cl..............................C07c 31/34
[58] Field of Search.........................260/633

[56] References Cited

UNITED STATES PATENTS 2,123,556  7/1938  Nicodemus.....................260/633
3,534,112  10/1970  Tindall........................260/638 N

FOREIGN PATENTS OR APPLICATIONS 1,261,278  2/1968  Germany.......................260/633

OTHER PUBLICATIONS

Eckstein et al., J. Chem. Soc. (1961) p. 1375

Primary Examiner—Howard T. Mars
Attorney—Hammond & Littell

[57] ABSTRACT

A novel process for preparing bromonitro alcohols of the formula

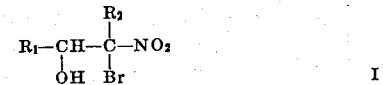

I wherein $R_1$ is selected from the group consisting hydrogen, methyl and halogenated methyl and $R_2$ is selected from the group consisting of hydrogen and methyl and ethyl which may be substituted with at least one hydroxy group comprising reacting an aldehyde with a nitroalkane in the presence of an aqueous alkali metal hydroxide and reacting the reaction product with bromine at temperatures below 25°C.

9 Claims, No Drawings

NOVEL PREPARATION OF BROMONITRO ALCOHOLS

STATE OF THE ART

The prior preparation of bromonitro alcohols of formula I was previously effected by reacting a nitromethane with an aldehyde and reacting the reaction product with the sodium salt of a nitroalcohol in an alcoholic solution to obtain a nitroalcohol which was then reacted with bromine in an organic solvent such as ether, chloroform or carbon tetrachloride to form the bromonitro alcohol. The reaction scheme is illustrated as follows:

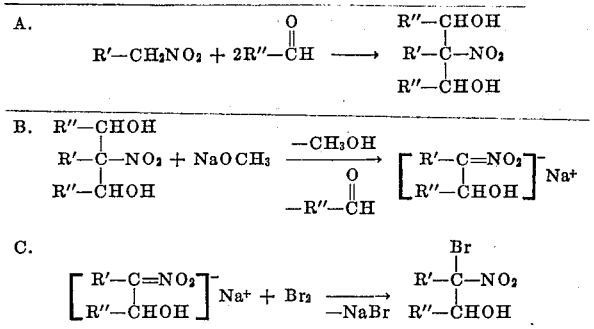

Attempts to scale up the said process from the laboratory stage to plant scale have met with considerable difficulties. The use of readily combustible solvents such as ethanol or ether is only possible if special precautions are taken to prevent explosions or inhalation of the solvents. The preparation of sodium alcoholate solutions from metallic sodium and alcohol which must be freshly prepared for optimum yields also requires special precautions to avoid dangers. The use of commercially available sodium ethylate or sodium methylate or sodium methylate solutions lead to considerable losses in the process yields.

The isolation of the sodium salts of the nitroalcohols in step B of the above reactions also causes great difficulties. Both the filtration and purification of the said salts are very time consuming even in small batches. Moreover, the said sodium salts are not very stable and when held in the air, decomposition begins after a short time with formation of a yellow color. Heating or a slight blow to the said salts can lead to a spontaneous decomposition of the salts.

To avoid these difficulties, attempts have been made to effect the bromination step before the added condensation by first brominating the nitroalkane to form the corresponding bromonitro alkane and reacting the latter with the aldehyde to form the bromonitro alcohol. While this process is quite good in the case of long chain nitroalkanes, unsatisfactory results are obtained with short chain nitroalkanes, particularly with nitromethane. For example, bromination of nitromethane in carbon disulfide resulted in a 40 percent yield of the bromonitro methane which could then be reacted with formaldehyde to form 2-bromo-2-nitro-propane-diol. This reaction does not eliminate the dangers involved in the use of highly combustible solvents.

Another process proposed for the production of bromonitro alcohols to avoid the isolation of intermediates and the use of dangerous products comprises reacting a nitroalkane, an aldehyde and calcium hydroxide or calcium chloride and sodium hydroxide to form a solution or suspension of a calcium salt of the desired nitroalcohol to which bromine is added to effect the bromination. This process was based on the unexpected discovery that magnesium salts or alkaline earth metal salts, such as the calcium salt, of nitroalcohols can be prepared due to their slight solubility at a pH of about 7 directly without isolation of intermediate stages from the nitroalkane, aldehyde and suitable inorganic salt. Moreover, the aqueous suspension could be brominated without intermediate isolation to obtain the corresponding bromonitro alcohol.

An improvement of this process to avoid formation of undesired by-products was effected by effecting bromination by adding the solution or suspension of the calcium salts into the given amount of bromine rather than by adding bromine to the solution or suspension of the calcium salts as done previously. However, this process has been found to be commercially advantageous only when a solution of the calcium salt of the nitroal cohol is formed which can be introduced without difficulty into the bromine. However, if a sparingly soluble precipitate of the calcium salt is formed so that the salt must be added almost completely as a suspension to the bromine, the bromination stage has serious difficulties.

OBJECTS OF THE INVENTION

It is an object of the invention to provide a novel process for the preparation of bromonitro alcohols without the use of highly combustible solvents.

It is a further object of the invention to provide a novel commercial process for the preparation of bromonitro alcohols without the problem of isolating unstable intermediate products.

These and other objects and advantages of the invention will become obvious from the following detailed description.

THE INVENTION

The novel process of the invention for the preparation of bromonitro alcohols of the formula

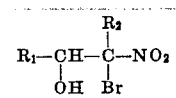

wherein $R_1$ is selected from the group consisting of hydrogen, methyl and halogenated methyl and $R_2$ is selected from the group consisting of hydrogen and methyl and ethyl which may be substituted with at least one hydroxy group such as the $R_1$–CHOH–group comprises reacting an aldehyde of the formula

wherein $R_1$ is selected from the group consisting of hydrogen, methyl and halogenated methyl with a nitroalkane of the formula $R_3$–$CH_2NO_2$ wherein $R_3$ is selected from the group consisting of hydrogen, methyl and ethyl and an alkali metal hydroxide such as sodium hydroxide or potassium hydroxide in the presence of water to obtain an aqueous solution of the alkali metal salt of the nitroalcohol and reacting at a temperature less than 25° C. the said aqueous solution with the given amount of bromine. The aqueous solution may be added to the bromine, or simultaneously the said solution and the given amount of bromine can be added to an inert organic solvent.

Preferably, the process is effected by mixing all the aldehyde with a portion of the nitroalkane and a small amount of the alkali metal hydroxide in solution to start the reaction which is indicated by a sharp rise in the temperature and then the reaction is completed while cooling by adding the rest of the nitroalkane and the sodium hydroxide solution whereby an aqueous solution of the alkali metal salt of the nitroalcohol is formed which can be reacted with the bromine. While sodium is preferred, other alkali metals such as potassium hydroxide can be used.

Since sodium salts of nitro alcohols were known from the literature to be unstable, serious doubts existed concerning the possibility of using the said salts as intermediates for the preparation of bromonitro alcohols, especially in view of their sensitivity to heat. It was, therefore, surprising that in the reaction indicated above in aqueous solution the sodium salts of the nitroalcohols did not decompose and gave yields of bromonitro alcohols which in many cases exceeded the yields obtained by the calcium salt reaction. For example, 1-bromo-1-nitro-propanol-2 can be prepared by the process of the invention in 82 percent yields as compared to the 73 percent yields of the calcium salt process.

Examples of suitable aldehydes for the process of the invention are formaldehyde, acetaldehyde, monochloro, dichloro, and trichloro-acetaldehyde. Suitable nitromethanes are nitro methane, nitro ethane and 1-nitro propane. The amounts of nitroalkane and aldehyde used depend upon the desired nitroalcohol and are preferably in stoichiometric amounts for monohydroxy alcohols and for dihydroxy alcohols, twice the molar amount of aldehyde is used. The amount of sodium hydroxide solution used is the amount necessary to form the sodium salt of the nitro alcohols.

To effect the bromination, the aqueous solution of the sodium salt of nitro alcohol is added to the necessary amount of bromine which is preferably dissolved in a halogenated hydrocarbon such as ethylene chloride, methylene chloride or chloroform. The rate of addition depends upon the removal of the heat of reaction so that the temperature does not rise above 25°C, preferably in the range of 0° to 20°C. The end of the bromination is easily recognized by the disappearance of the bromine color.

The process can also be carried out continuously. The bromination can also be effected by simultaneously adding the aqueous solution of the alkali metal salts and bromine with stirring to an inert organic solvent such as a halogenated hydrocarbon at temperatures not above 25°C. The bromine should then be maintained in an excess as can be seen from the color of the solvent.

The bromonitro alcohol can be recovered in known ways by recrystallization or distillation. However, in many cases no purification of the products is required.

The said bromonitro alcohols have antimicrobic activity with a broad spectrum of activity, short kill times and low inhibiting concentrations.

In the following examples there are described several preferred embodiments to illustrate the invention. However, it is to be understood that the invention is not intended to be limited to the specific embodiments.

EXAMPLE I

2-Bromo-2-Nitro-Propane-Diol-1,3

A mixture of 86 gm (1.05 moles) of a 37 percent formaldehyde solution and 25 gm of nitro-ethane were stirred while dropping therein 10 cc of a sodium hydroxide solution prepared from 40 gm (1 mole) of sodium hydroxide and 200 cc of water during which time the temperature rose to 55°C. After cooling the mixture to 40°C, an additional 54 gm (total of 1.05 mole) of nitro-ethane were added dropwise while keeping the temperature at 40°C. and then stirring was continued for 30 minutes at 40°C. 150 cc of water were then added to the reaction mixture which was cooled to 20°C. The remainder of the sodium hydroxide solution was then added with stirring while keeping the temperature at 20°C and the mixture was stirred for another 30 minutes.

The resulting clear solution and 159.8 gm (1 mole) of bromine were simultaneously added with stirring to 200 cc of carbon tetrachloride while keeping the temperature at 10°C and always maintaining an excess of bromine as indicated by the color. At the end of the addition of the reactants, the reaction mixture was colorless. The lower phase was decanted and the solvent was distilled off to obtain 177.5 gm of 2-bromo-2-nitro-propanol melting at 33°–35°C.

EXAMPLE II

1-Bromo-1-Nitro-Propanol-2

A mixture of 48.5 gm (1.1 moles) of acetaldehyde and 20 gm of nitromethane were stirred in an apparatus equipped with a reflux condenser and then 3 cc of a sodium hydroxide solution prepared from 40 gm (1 mole) of sodium hydroxide and 200 cc of water were added dropwise to the stirred mixture during which the temperature rose to 70°C. After cooling the mixture to 60°C, another 41 gm (total of 1 mole) of nitromethane were added and the mixture was stirred for another 30 minutes at 60°C. The mixture was then cooled to 20°C and 150 cc of water were added followed by dropwise addition of the rest of the sodium hydroxide solution while keeping the temperature at 20°C.

The resulting solution was reacted with bromine as in Example I to obtain 181.3 gm (98.5 percent yield) of raw product which was then subjected to distillation to obtain 148.3 gm (82 percent yield) of 1-bromo-1-nitro-propanol-2 having a boiling point of 56°C at 0.01 mm Hg and a refractive index $n_D^{20} = 1.4932$.

EXAMPLE III

2-Bromo-2-Nitro-Propane-Diol-1,3

40 gm (1 mole) of sodium hydroxide were dissolved in 800 cc of water and 150 cc of the resulting solution were added with stirring to 163 gm (2 moles) of a 37 percent formaldehyde solution. Then, 61 gm (1 mole) of nitromethane were added with stirring while keeping the temperature not above 30°C and after cooling to 20°C, the balance of the sodium hydroxide solution was added while keeping the temperature at 20°C.

The bromination was effected as in Example I except that the carbon tetrachloride was replaced by ethylene chloride to obtain 168 gm (84% yield) of 2-bromo-2-nitro-propanediol-1,3 melting at 118°C.

EXAMPLE IV

1-Bromo-1-Nitro-3,3,3-Trichloropropanol-2

165.5 gm (1 mole) of chloral hydrate were admixed with stirring with 18 gm (1 mole) of water and the mixture was heated to 55°C. 15 gm of nitromethane were added with stirring to the mixture during which the temperature rose to 75°C. 20 cc of a sodium hydroxide solution prepared from 40 gm (1 mole) of sodium hydroxide and 200 cc of water were added to the reaction mixture and then another 44 gm (total of 1 mole) of nitromethane were added dropwise with stirring and slight cooling. The mixture was stirred for 30 minutes at 60°C and after cooling to 20°C, 400 cc of water and then the balance of the sodium hydroxide solution was added with cooling.

The resulting solution was then brominated as in Example I to obtain 281 gm (98 percent yield) of crude product which upon distillation yielded 247 gm (86 percent yield) of 1-bromo-1-nitro-3,3,3-trichloropropanol-2 having a boiling point of 76–78°C at 10 mm Hg. and a refractive index $n_D^{20} = 1.5376$.

Various modifications of the process of the invention may be made without departing from the spirit or scope thereof and it should be understood that the invention is intended to be limited only as defined in the appended claims.

I claim:

1. A process for the preparation of bromo-nitro alcohols of the formula

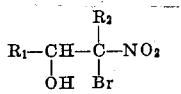

wherein $R_1$ is selected from the group consisting of hydrogen, methyl and chlorinated methyl and $R_2$ is selected from the group consisting of hydrogen and methyl and ethyl which may be substituted with a hydroxy group comprising reacting an aldehyde of the formula

wherein $R_1$ is selected from the group consisting of hydrogen, methyl and chlorinated methyl with a nitroalkane of the formula $R_3\text{-}CH_2NO_2$ wherein $R_3$ is selected from the group consisting of hydrogen, methyl and ethyl and an alkali metal hydroxide in the presence of water to obtain an aqueous solution of the alkali metal salt of the nitroalcohol and reacting at a temperature from 0° to 25°C the said aqueous solution with the given amount of bromine.

2. The process of claim 1 wherein the alkali metal hydroxide is sodium hydroxide.

3. The process of claim 1 wherein the reaction with bromine is effected between 0° and 20°C.

4. The process of claim 1 wherein the aldehyde is formaldehyde.

5. The process of claim 1 wherein the nitroalkane is nitromethane.

6. The process of claim 1 wherein the aqueous solution and bromine are added simultaneously to an inert organic solvent while maintaining an excess of bromine in the solvent.

7. The process of claim 1 wherein the aqueous solution is added to bromine in an inert organic solvent.

8. The process of claim 1 wherein the aldehyde, nitroalkane and alkali metal hydroxide are present in stoichiometric amounts.

9. The process of claim 1 wherein there are two moles of aldehyde per mole of nitroalkane.

* * * * *